US006782910B2

(12) United States Patent
Mondani et al.

(10) Patent No.: US 6,782,910 B2
(45) Date of Patent: Aug. 31, 2004

(54) MULTI-FUNCTION HYDRAULIC VALVE ASSEMBLY

(75) Inventors: Luciano Mondani, Piacenza (IT); Mark Dodd, Seneca, SC (US)

(73) Assignee: Lift Technologies, Inc., Ontario (CA)

( * ) Notice: Subject to any disclaimer, the term of this patent is extended or adjusted under 35 U.S.C. 154(b) by 201 days.

(21) Appl. No.: 10/120,789

(22) Filed: Apr. 12, 2002

(65) Prior Publication Data

US 2003/0164189 A1 Sep. 4, 2003

Related U.S. Application Data

(60) Provisional application No. 60/361,075, filed on Mar. 1, 2002.

(51) Int. Cl.[7] .................................................. G05D 7/00

(52) U.S. Cl. ............. 137/106; 137/625.25; 137/625.69; 91/521; 91/528

(58) Field of Search ................................ 137/106, 508, 137/518, 521, 528, 529, 530, 625.18, 625.25, 625.69, 625.68, 624.48; 91/508, 518, 521, 528, 529, 530, 533, 536

(56) References Cited

U.S. PATENT DOCUMENTS

| | | | | |
|---|---|---|---|---|
| 3,782,249 A | * | 1/1974 | Drone | 137/106 |
| 5,139,385 A | | 8/1992 | Chase et al. | |
| 2002/0007946 A1 | | 1/2002 | Purkis et al. | |

FOREIGN PATENT DOCUMENTS

| | | |
|---|---|---|
| EP | 0 644 336 | 3/1995 |
| FR | 843 328 | 6/1939 |
| FR | 2 720 123 | 11/1995 |
| NL | 7 203 122 | 9/1973 |

* cited by examiner

*Primary Examiner*—Kevin Lee
(74) *Attorney, Agent, or Firm*—Nixon & Vanderhye PC

(57) ABSTRACT

A hydraulic valve assembly for selectably delivering hydraulic fluid from a supply of hydraulic fluid to one of a first hydraulic operator and a second hydraulic operator is disclosed. The assembly includes first and second supply ports which communicate with the supply and four operator ports. First and third ports communicate with the first hydraulic operator. Second and fourth ports communicate with the fourth hydraulic operator. First and second chambers are provided. The first chamber communicates with the first supply port and first and second operator ports. The second chamber communicates with the second supply port and third and fourth operator ports. Two selection valves operating in unison are each located in each chamber. The selection valves operate between a first position at a first hydraulic fluid pressure and a second position at a second hydraulic fluid pressure. In a first position, the valves permit fluid communication of the first and second supply ports with the first and third operator ports, respectively. In a second position, the valves permit fluid communication with the second and fourth operator ports.

29 Claims, 9 Drawing Sheets

MULTI-FUNCTION HYDRAULIC VALVE ASSEMBLY

This application claims the benefit of Provisional Application No. 60/361,075, filed Mar. 1, 2002, the entire content of which is hereby incorporated by reference in this application.

FIELD OF THE INVENTION

The invention is related to hydraulic systems, and in particular, to a multi-function hydraulic valve assembly.

BACKGROUND OF THE INVENTION

The use of hydraulic systems for moving or lifting loads is well known. Typically, such systems utilize hydraulic fluid under pressure to drive hydraulic operators, such as piston/cylinder arrangements. A piece of machinery, such as a hoist or a truck, may require several hydraulic operators to move the load in different ways. Typically, the various hydraulic operators are each controlled by a lever located in the cab of the machine or vehicle. One example where hydraulic systems are used in this way are lift trucks.

Lift trucks are vehicles which are used to pick up and move loads from place to place. A conventional lift truck includes a carriage which supports a pair of forks. The forks are maneuvered into place by the lift truck operator and are used to pick up the load. The carriage rides vertically in a mast, which also supports the carriage. In addition the mast may be tilted backward to facilitate stabilizing the load on the forks. Two separate hydraulic operators are used to move the carriage vertically and to tilt the mast.

Several attachments to enhance the capabilities of the lift truck are known in the art. One such attachment is a side shift assembly which facilitates aligning the spaced pair of forks with the load. The term "side shifting" is used to describe the concept of shifting the forks as a spaced pair either left or right of the vehicle center line. This function provides the operator with a greater margin for error when aligning the vehicle with the load. A hydraulic operator, such as a piston/cylinder arrangement is typically used by the side shifting assembly to move a frame to which the forks are secured.

Another attachment to enhance the capability of a lift truck is a fork positioning assembly. The term fork positioning is used to describe the concept of changing the relative spacing between the forks to accommodate loads of different widths. Again, a hydraulic operator, such as a piston/cylinder arrangement is used in the fork positioning assembly to move the forks.

A cab of a conventional lift truck provides three levers to operate three hydraulic operators. Accordingly, if a user requires four hydraulic operators, such as, for example, by installing a fork positioning attachment, an additional lever must be installed to operate the fork positioning attachment.

Alternatively, prior art systems permit operation of two separate hydraulic operators with a single lever on a lift truck. These systems utilize an electrical circuit to toggle between the two hydraulic operators. Prior to moving the lever which actuates the hydraulic system, the user would activate the electrical switch to select the appropriate hydraulic operator. This system adds expense and complexity to the design of the lift truck. In addition, electrical cables must be provided and extended over the lift truck mast.

Accordingly, there is a need for a hydraulic valve assembly which permits selectable hydraulic operation of more than one hydraulic operator with a single lever.

SUMMARY OF THE INVENTION

According to a first aspect of the invention, a hydraulic valve assembly for delivering hydraulic fluid from a supply of hydraulic fluid to one of a first hydraulic operator and a second hydraulic operator is provided. The assembly comprises:

a) a valve block defining:
   i) a first supply port adapted for fluid communication with said supply;
   ii) a second supply port adapted for fluid communication with said supply;
   iii) a first operator port adapted for fluid communication with said first hydraulic operator;
   iv) a second operator port adapted for fluid communication with said second hydraulic operator;
   v) a third operator port adapted for fluid communication with said first hydraulic operator;
   vi) a fourth operator port adapted for fluid communication with said second hydraulic operator;
   vii) a first chamber, said first chamber being in fluid communication with said first supply port, said first operator port, and said second operator port;
   viii) a second chamber, said second chamber being in fluid communication with said second supply port, said third operator port and said fourth operator port;

b) a first selection valve located in said first chamber and a second selection valve located in said second chamber, said first and second selection valves being adapted to move in unison, said first and second selection valves operable between a first position when said hydraulic fluid is at a first pressure and a second position when said hydraulic fluid is at a second pressure, where in said first position, said first selection valve permits fluid communication between said first supply port and said first operator port, and said second selection valve permits fluid communication between said second supply port and said third operator port, where, in said second position, said first selection valve permits fluid communication between said first supply port and said second operator port, and said second selection valve permits fluid communication between said second supply port and said fourth operator port; wherein said first pressure is lower than said second pressure.

According to a second aspect of the invention, a hydraulic valve assembly for delivering hydraulic fluid from a supply of hydraulic fluid to one of a first hydraulic operator and a second hydraulic operator is provided. The assembly comprises:

a) a valve block defining:
   i) a supply port adapted for fluid communication with said supply;
   ii) a first operator port adapted for fluid communication with said first hydraulic operator;
   iii) a second operator port adapted for fluid communication with said second hydraulic operator;
   iv) a chamber, said chamber being in fluid communication with said supply port, said first operator port, and said second operator port;

b) a selection valve located in said chamber, said selection valve operable between a first position when said hydraulic fluid is at a first pressure and a second position when said hydraulic fluid is at said second pressure, where in said first position, said selection valve permits fluid communication between said supply port and said first operator port, where in said second position, said first selection valve permits fluid communication between said supply port and said second operator port; wherein said first pressure is lower than said second pressure.

BRIEF DESCRIPTION OF THE DRAWINGS

The invention will now be described, by way of example only, with reference to the accompanying figures, where.

DETAILED DESCRIPTION OF THE INVENTION

Figure 1:
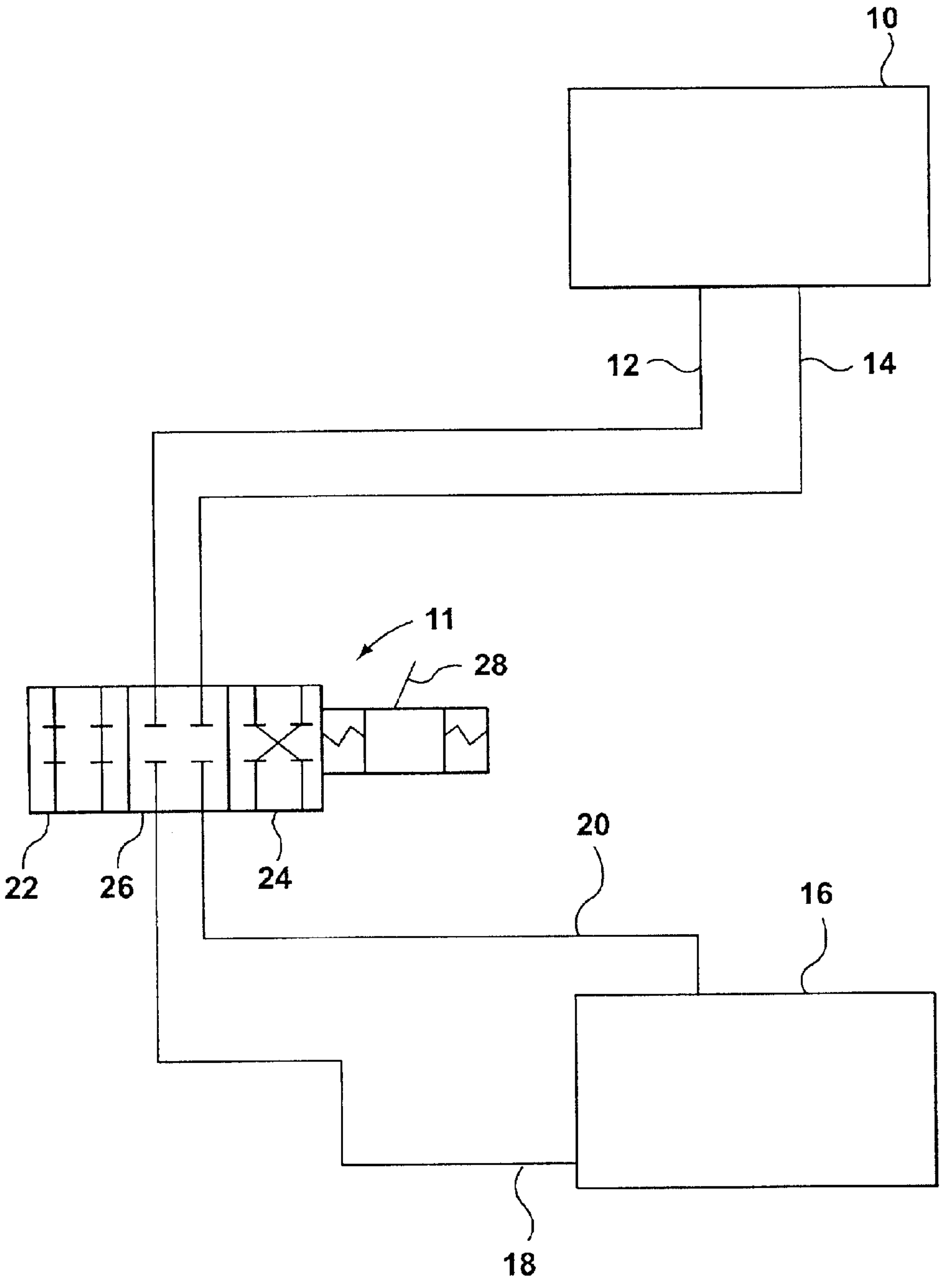
FIG. 1 is a schematic of a hydraulic system for a lift truck.

FIG. 1 shows a hydraulic system for a lift truck connected to a valve assembly 10 according to a preferred embodiment of the present invention. The valve assembly 10 is connected to a control panel 11 by a first hydraulic supply line 12 and a second hydraulic supply line 14. The control panel 11 is connected to a hydraulic fluid tank 16 by a tank supply line 18 and a tank return line 20. A pump (not shown) is connected to the tank supply line 18 to provide the hydraulic fluid under pressure.

Referring again to FIG. 1, the control panel 11 includes a hydraulic circuit 26 to interchangeably connect the tank supply and return lines 18, 20 to the first and second hydraulic supply lines 12 and 14. The circuit 26 is operated in a conventional manner and will not be further described.

The circuit 26 is hydraulically connected to three corresponding levers in the lift truck cab. Other similar circuits may be used to control other vehicle functions such as mast tilting, carriage raising, and the like. For convenience, only the lever 28 for operating the particular circuit 26 is shown. It will be understood by those skilled in the art that other types of actuators may be provided.

Figure 2:
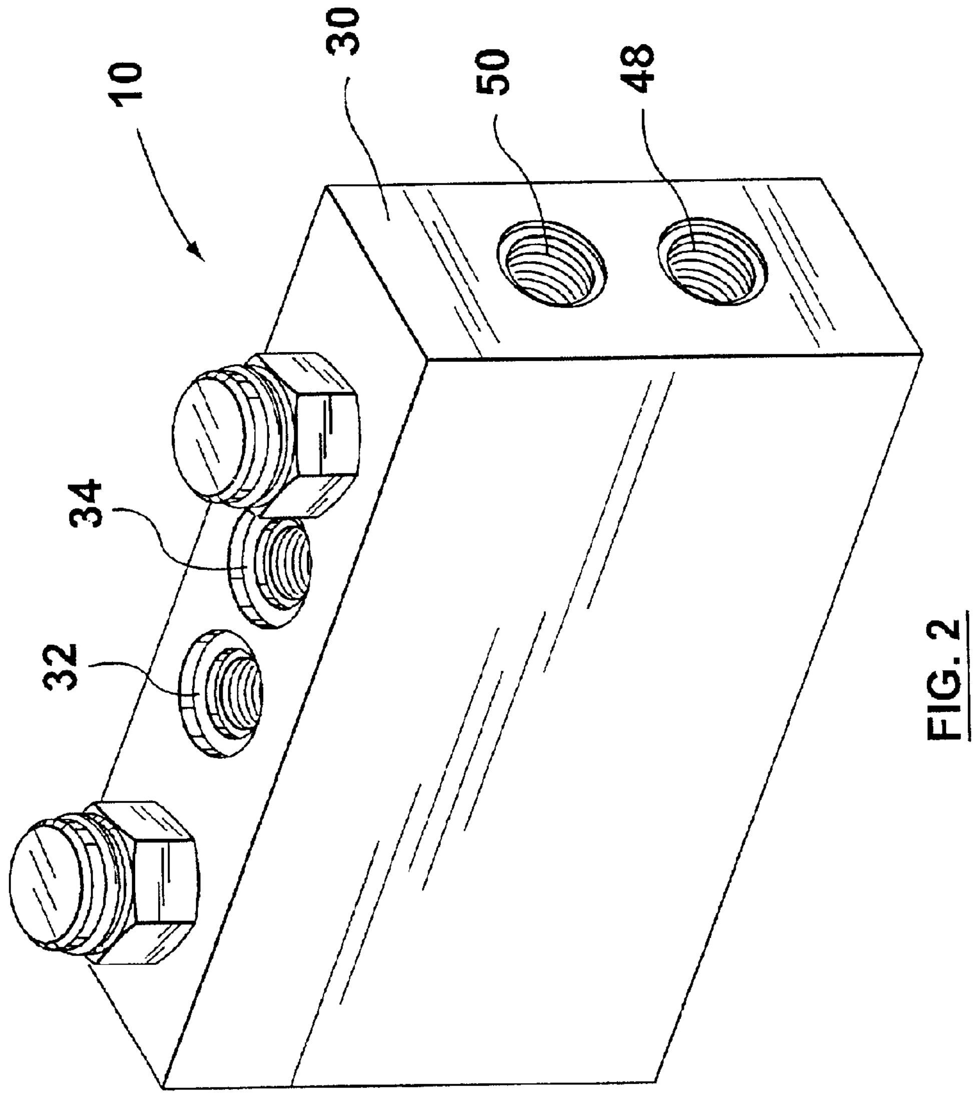
FIG. 2 is a perspective view of a valve assembly according to a preferred embodiment of the present invention.

Referring now to FIG. 2, the valve assembly includes a valve block 30, which preferably has a box-like shape. A first supply port 32 and a second supply port 34 are provided in the valve block 30. The first and second supply ports 32, 34 communicate with first and second hydraulic supply lines 12, 14 (shown in FIG. 1), respectively. Preferably the supply ports 32, 34 are located on the same face of the block 30. An orifice valve 35 (shown in FIGS. 5A–5D) is preferably provided between the supply ports 32 and 34. The function of this orifice valve is discussed below. Preferably, the diameter of the orifice valve may be about 0.043 inches.

Figure 3:
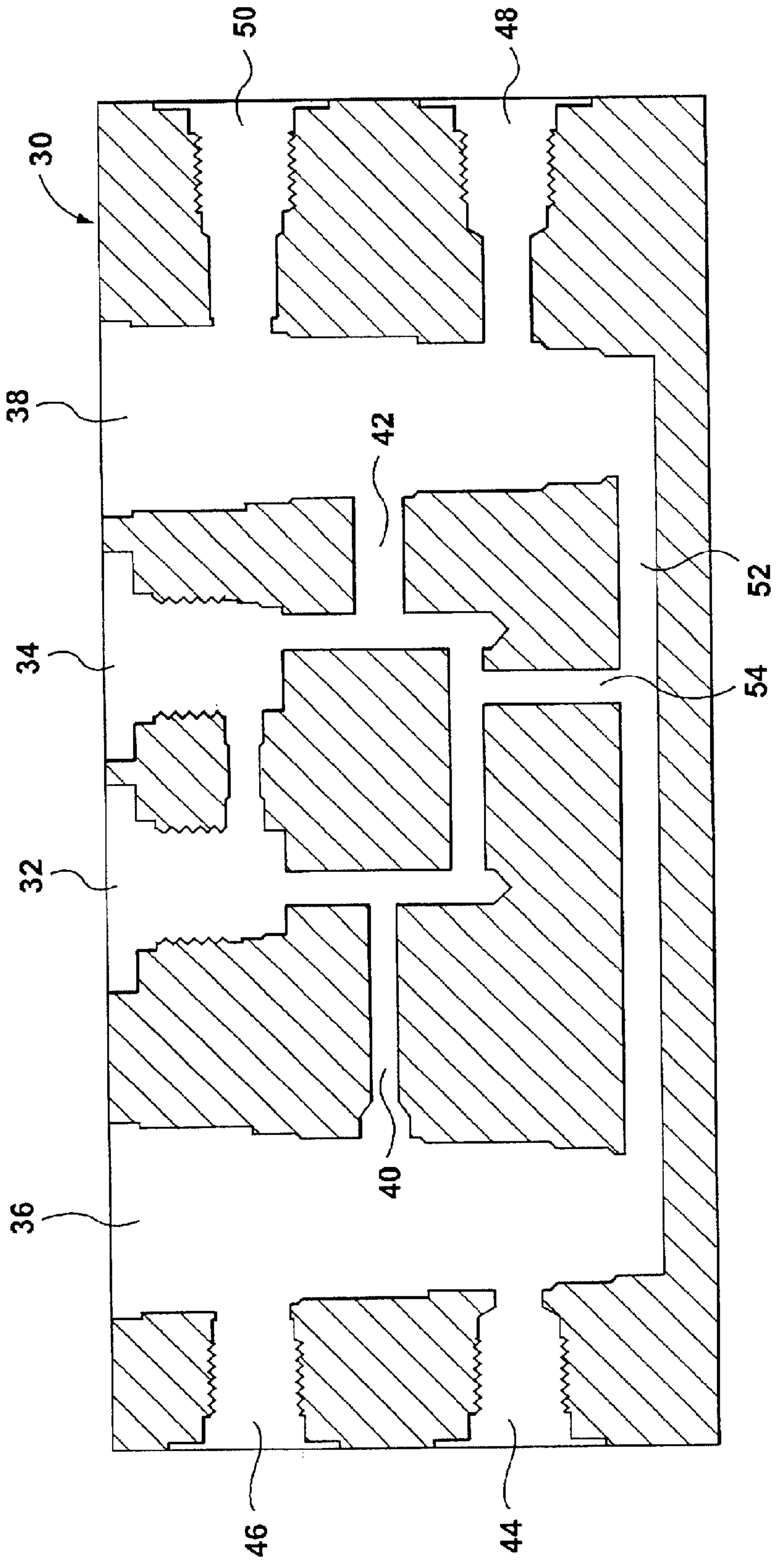
FIG. 3 is a cross-sectional view of a valve block for the preferred embodiment of FIG. 2.
Figure 4:
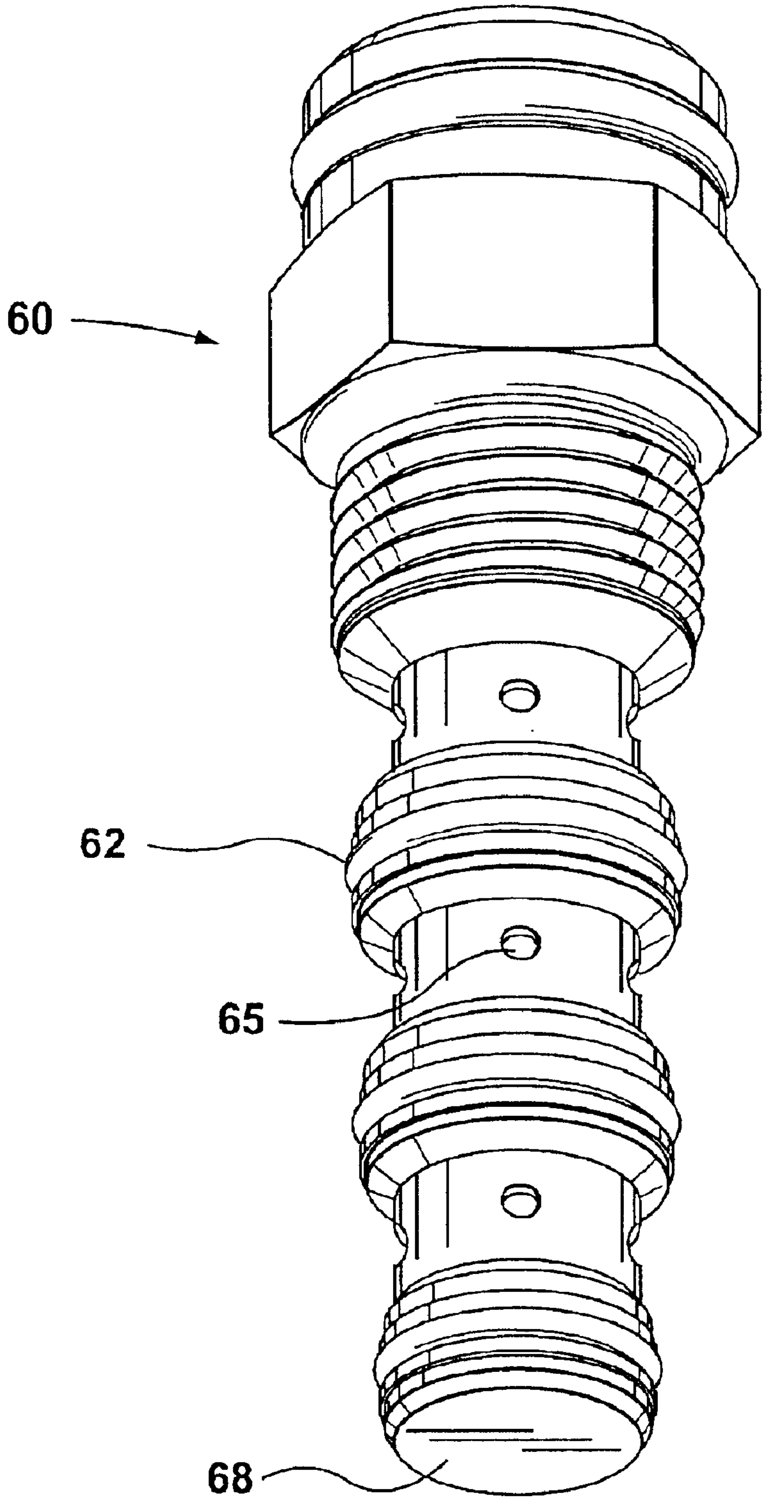
FIG. 4 is a perspective view of a selection valve for the preferred embodiment of FIG. 2.

Referring now to FIG. 3, a first chamber 36 and a second chamber 38 are provided in the valve block 30. The first and second chambers 36, 38 communicate with first and second supply ports 32, 34 via first and second block channels 40 and 42.

Referring again to FIG. 3, four operator ports are provided in the valve block 30. Preferably, a first operator port 44 and a second operator port 46 are provided on one face of the block 30, and a third operator port 48 and a fourth operator port 50 are provided on the opposite face of the block 30. The first and second operator ports 44, 46 communicate with the first chamber 36. The third and fourth operator ports 48, 50 communicate with the second chamber 38.

Figure 6:
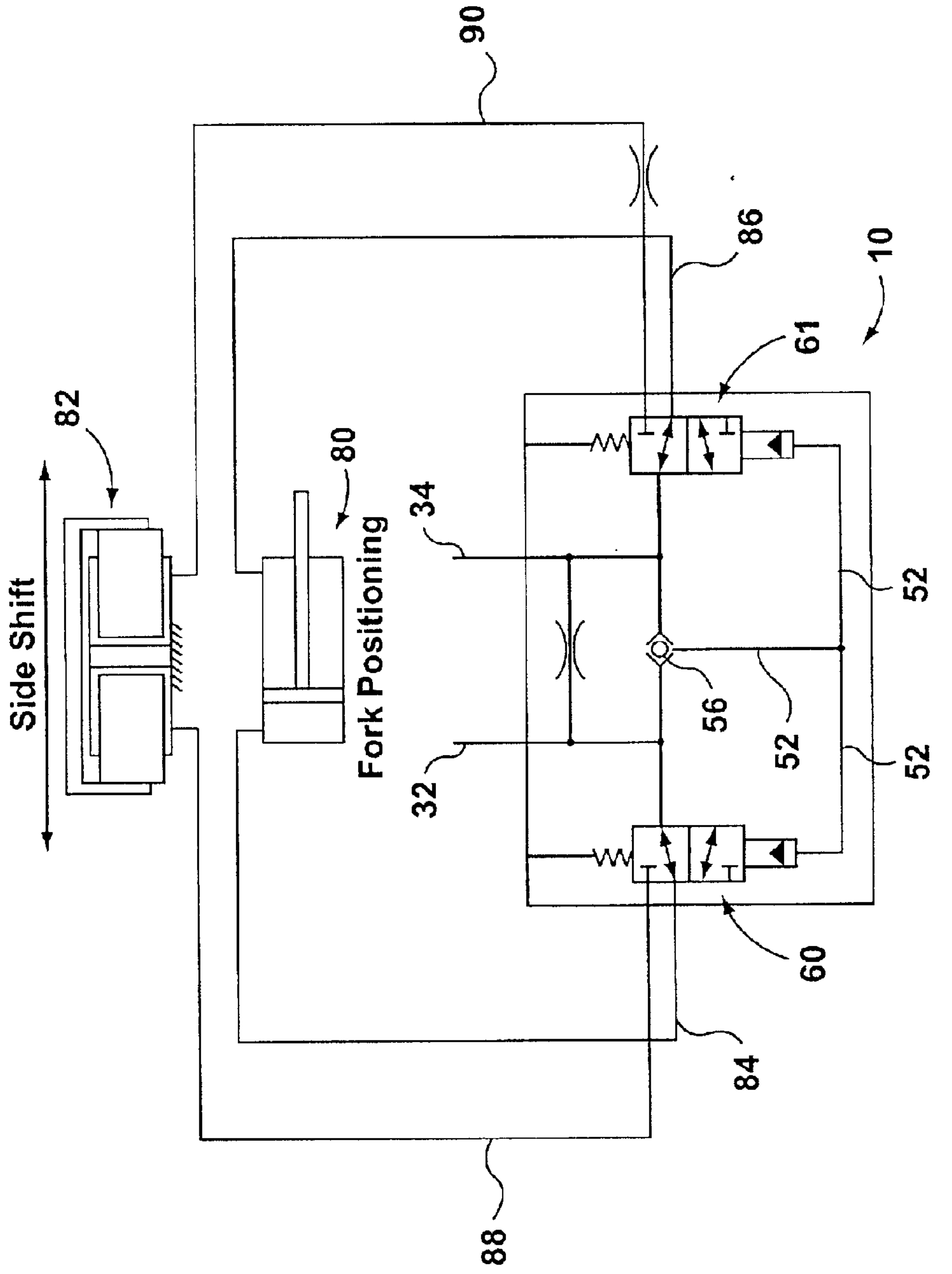
FIG. 6 is a schematic view showing the preferred embodiment of FIG. 2 connected to a side shifter and fork positioner.

Referring now to FIG. 6, The first and third operator ports 44, 48 are connected to corresponding ports (not shown) of a first conventional hydraulic operator 80. The first hydraulic operator may be, for example, a fork positioning cylinder. The second and fourth operator ports 46, 50 are connected to corresponding ports (not shown) of a second hydraulic operator 82. The second hydraulic operator may be, for example, a side shifting cylinder.

Referring again to FIG. 3, a pilot channel 52 is provided in the valve block 30. The pilot channel 52 communicates with first and second chambers 36, 38. The pilot channel 52 also communicates with first and second block channels 40, 42, all three meeting at an intersection 54. As shown schematically in FIGS. 5A–5D, a bi-directional valve 56 is located in the intersection 54. Preferably, the bi-directional valve is a conventional ball and shuttle valve. The bi-directional valve alternatively connects pilot channel 52 with block channel 40 or block channel 42.

Referring now to FIGS. 4 and 5A–D, a first conventional selection valve 60 is located in the first chamber 36 and a second conventional selection valve 61 is located in the second chamber 38. Preferably, the selection valves 60, 61 are identical. Preferably, such valves are commercially available from various valve manufacturers. One useful example is a valve sold by Hydraforce Inc. (Model No. PD 10-40). The first selection valve 60 includes a generally cylindrical valve housing 62 mounted in the first chamber 36. The cylindrical valve housing 62 has an open end proximate to the pilot channel 52, and defines an internal valve chamber 64. The cylindrical valve housing 62 also includes a plurality of radially directed circumferentially arranged openings 65 for communicating with the first chamber 36. A moving valve body 66 is located within the valve chamber 64 of valve housing 62. The valve body 66 has a pressure surface 68 adjacent the open end of the valve housing 62. The valve body 66 has a narrower portion which defines an annular space 69. The radially directed openings 65 communicate with the annular space 69 between the valve body 66 and the valve housing 62. The valve body 66 is connected to a spring 74 located in a closed end of the cylindrical valve housing 62. Valve body 66 may be moved relative to valve housing 62 by collapsing the spring 74. The spring 74 biases the valve body 66 to the position shown in FIGS. 5A and 5B. Preferably, the spring resistance is configured such that a pressure of 315 PSI or greater applied to pressure surface 68 is required to collapse the spring 74 so that the valve body 66 may move to the position shown in FIGS. 5C and 5D.

A number of external O-rings 70, 72 are provided to seal portions of the first selection valve 60 against portions of the wall of the first chamber 36. Internal O-rings (not shown) are also provided to seal the upper and lower ends of the annular space 69 from the remainder of the valve chamber 64 to prevent bleeding of fluid between the valve body 66 and valve housing 62.

As the second selection valve 61 is the same as the first selection valve 60, it will not be described in detail.

Referring now to FIG. 6, the operation of the valve assembly 10 according to the present invention will now be described. For convenience, the operation of the present invention will be described in conjunction with a conventional hydraulically-operated fork positioner 80 and side shifter 82 for a lift truck. For the purposes of the description, the first hydraulic operator will be the fork positioner, and the second hydraulic operator will be the side shifter. It will be understood by those skilled in the art that the present invention may be operated with any two hydraulic operators requiring different pressure, and is not confined to fork positioners and side shifters, or to hydraulic operators for lift trucks. The operators could be used for any desired function, such as rotating, tilting, clamping, or the like.

Referring to FIG. 1, when the lift truck operator wishes to actuate the fork positioner in a first direction, such as to narrow the forks, the operator moves the lever 28 part-way in one direction. The circuit 26 is partially activated to supply hydraulic fluid from the hydraulic fluid tank 16 along tank supply line 18, through section 22, and then to the first hydraulic supply line 12. Because, the circuit 26 is only partly activated, the flow rate of hydraulic fluid in the first hydraulic supply line 12 is low, resulting in low pressure as explained below. Preferably, low pressure means pressure below 315 PSI.

Figure 5A:
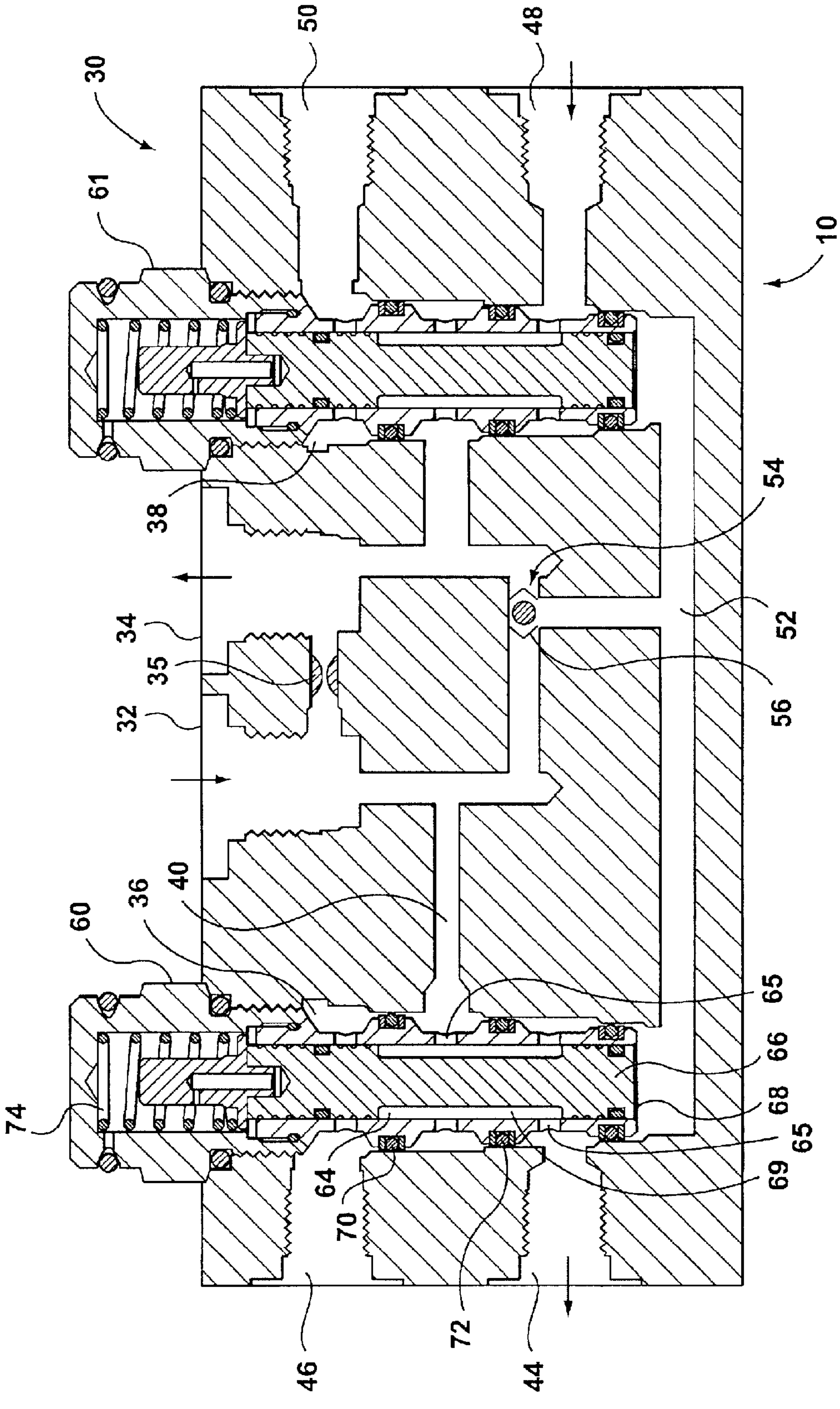
FIG. 5A is a cross-sectional view of the preferred embodiment of FIG. 2 in a first position showing fluid flow in one direction.

Referring now to FIG. 5A, the hydraulic fluid enters the first supply port 32 and flows into first channel 40. The pressure of the fluid in first block channel 40 moves the bi-directional valve 56 into a position permitting fluid communication between first block channel 40 and pilot channel 52, while sealing off communication between second block channel 42 and the pilot channel 52. The pressure of the fluid in the pilot channel 52 acts on the pressure surface 68 of each of the selection valves 60, 61. Because the pressure is below 315 PSI, neither of the valve bodies 66 of the selection valves 60, 61 move. Accordingly, the annular channels of selection valves 60 and 61 remain aligned with first operator port 44 and third operator port 48, respectively. The supply fluid in first block channel 40 also enters the annular space 69 through the radially directed openings 65 in the cylindrical housing 62 of the first selection valve 60. The fluid exits from the annular space 69 of first selection valve 60 through additional radially directed openings 65 and enters first operator port 44. The fluid is prevented from entering second operator port 46 by O-ring 70 and the internal O-rings of the selection valve 60.

Referring to FIG. 6, the hydraulic fluid travels to the fork positioner 80 by line 84 connected to first operator port 44. As the fork positioner is actuated to narrow the forks, hydraulic fluid also leaves the fork positioner 80 and enters third operator port 48 via line 86. The fluid is routed to second block channel 42 through the second selection valve 61, in a similar but reverse manner as described for first selection valve 60. The fluid exits the valve assembly 10 at second supply port 34 along second supply line 14.

Referring now to FIG. 1, the fluid travels along second hydraulic supply line 14 to circuit 26 and is directed into tank return line 20 to complete the loop.

If the operator wishes to widen the forks, the operator moves the lever 28 part-way in the opposite direction causing the circuit 26 to partially activate so that section 24 is employed to direct a low pressure flow of fluid from the hydraulic fluid supply tank 16 into the second hydraulic supply line 14.

Figure 5B:
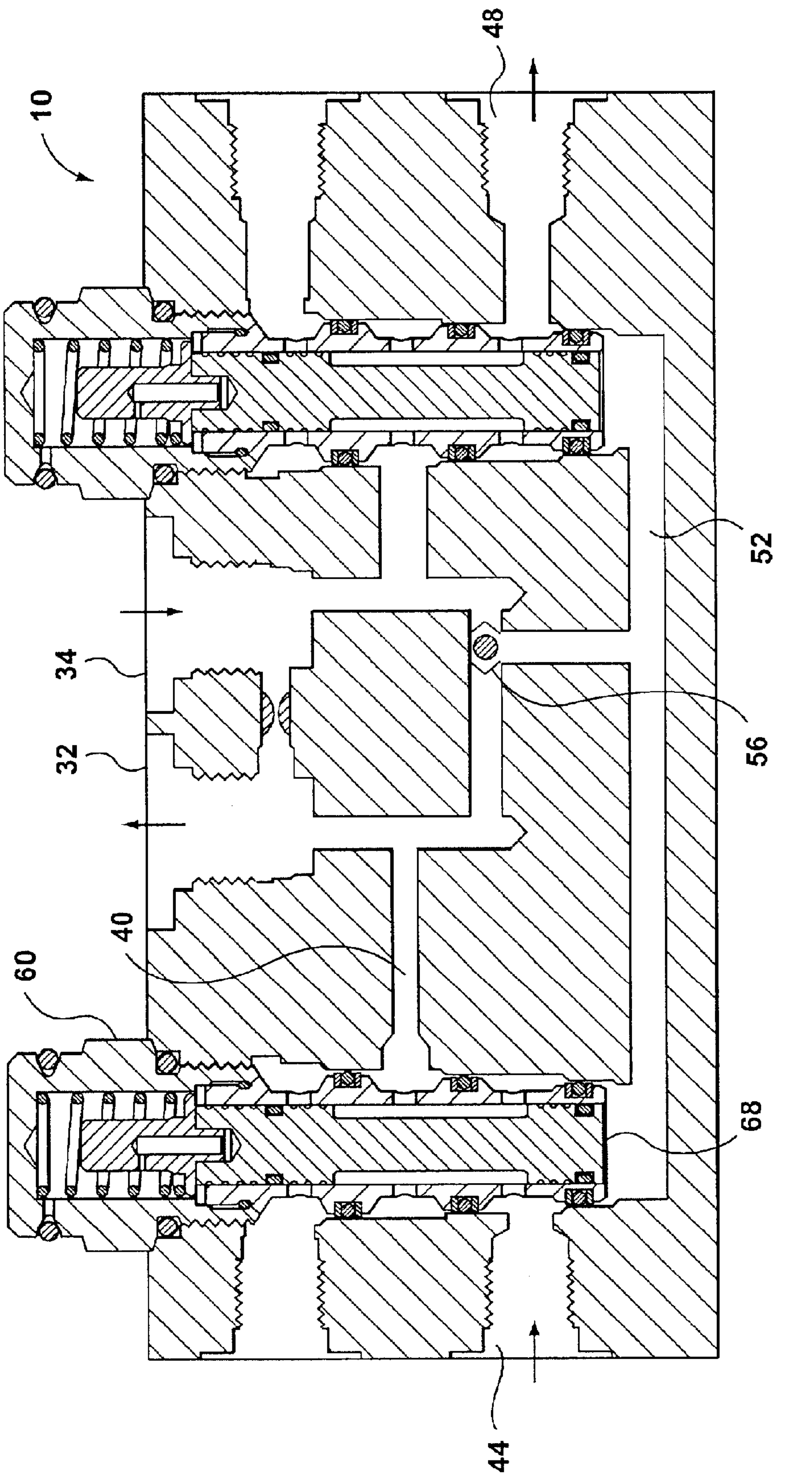
FIG. 5B is a cross-sectional view of the preferred embodiment in the first position as shown in FIG. 5A, but showing fluid flow in an opposite direction.

Referring now to FIG. 5B, the hydraulic fluid enters the valve block 30 via the second supply port 34 and into the second block channel 42. The bi-directional valve 56 is moved in the other direction such that it is now the second block channel 42 which communicates with the pilot channel 52. Because it is low pressure fluid, neither of the valve bodies 66 of selection valves 60 and 61 move from the position shown in FIG. 2B. However, the hydraulic fluid flows through second selection valve 61 in the same manner as described for the first selection valve 60. The hydraulic fluid flows out of third operator port 48 and into line 86 to the fork positioner 80. This causes the fork positioner to operate in the opposite direction.

Hydraulic fluid flowing out of fork positioner 80 into line 84, enters the valve assembly 10 at first operator port 44. The returning fluid is directed into first channel 40 by the first selection valve 60, as described above. The fluid exits at first supply port 32 and is returned to the tank return line 20 via first supply line 12. Thus, moving the lever 28 either way causes the fork positioner 80 to move in either direction (i.e. narrowing or widening the fork spacing).

Referring to FIG. 1, if the lift truck operator wishes to actuate the side shifter in one direction, the operator moves the lever 28 all the way in the first direction. The circuit 26 is fully activated, routing the fluid from tank supply line 18 through section 22 to first supply line 12. Full activation of circuit 26 results in high pressure in first supply line 12. Preferably, high pressure means pressure of 315 PSI or higher.

Figure 5C:
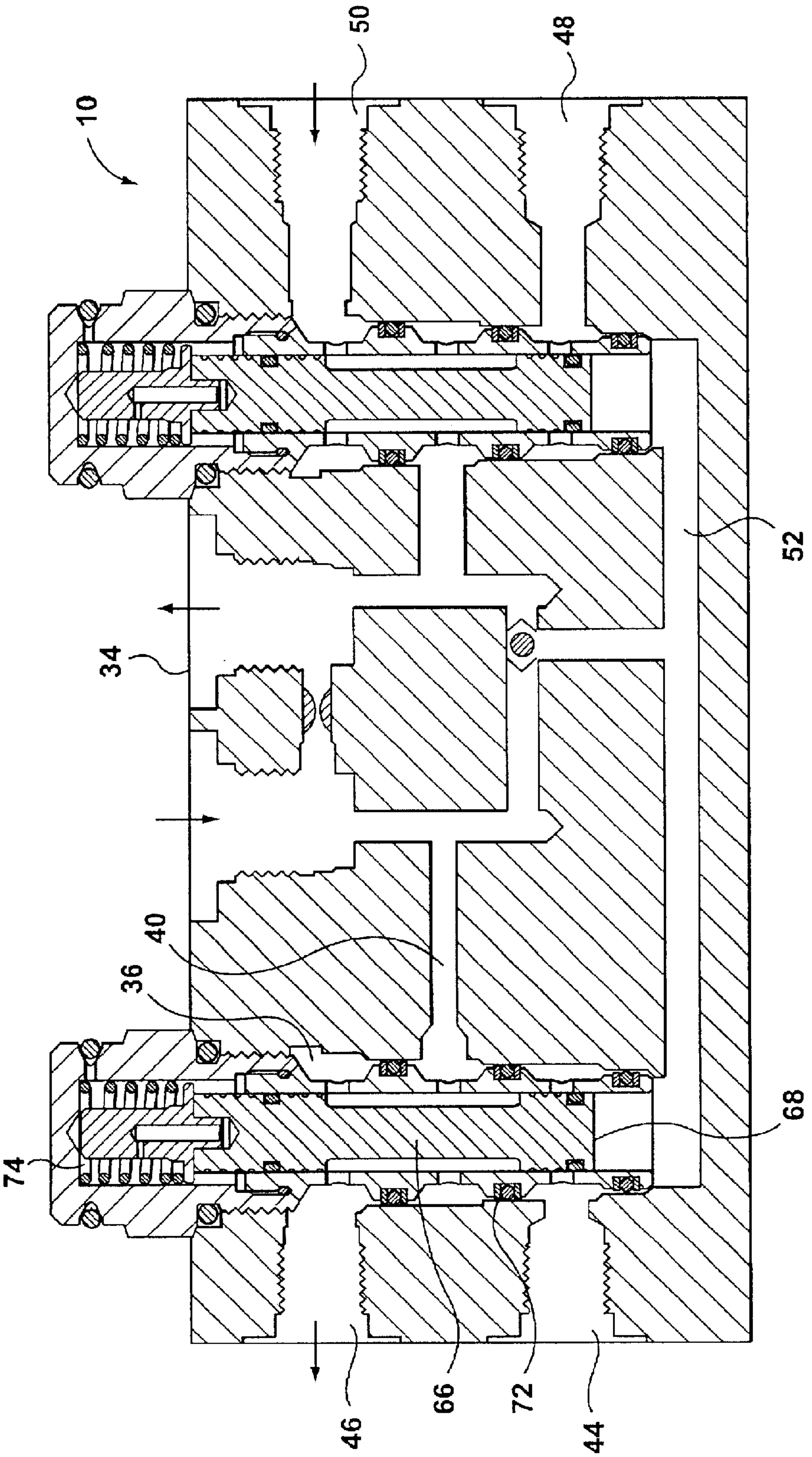
FIG. 5C is a cross-sectional view of the preferred embodiment of FIG. 2 in a second position showing fluid flow in one direction.

Referring to FIG. 5C, the hydraulic fluid enters the first chamber 36 along the same path as described for the narrowing function of the fork positioner. In addition, the now high pressure fluid passes to the pilot channel 52 and acts against surface 68 of each of the valve bodies 66 of the selection valves 60 and 61. Because the pressure in the pilot channel 52 acting against pressure surface 68 of each valve body 66 is greater than the resistance of the respective springs 74, the valve body 66 of each selection valve moves against the spring 74. This moves the valve bodies 66 to the positions shown in FIGS. 5C and 5D, and thereby permits fluid in first block channel 40 to flow through annular space 69 and into second operator port 46. O-ring 72 prevents fluid communication with first operator port 44. Accordingly, hydraulic fluid flows to the side shifter 82 along line 88. Hydraulic fluid returns to fourth operator port 50 along line 90, then through selection valve 61. The fluid flows through the valve block 30 and out through the second supply port 34 in a manner analogous to the manner described above. The fluid is returned to the tank in the same manner as described for the narrowing function of the fork positioner.

Figure 5D:
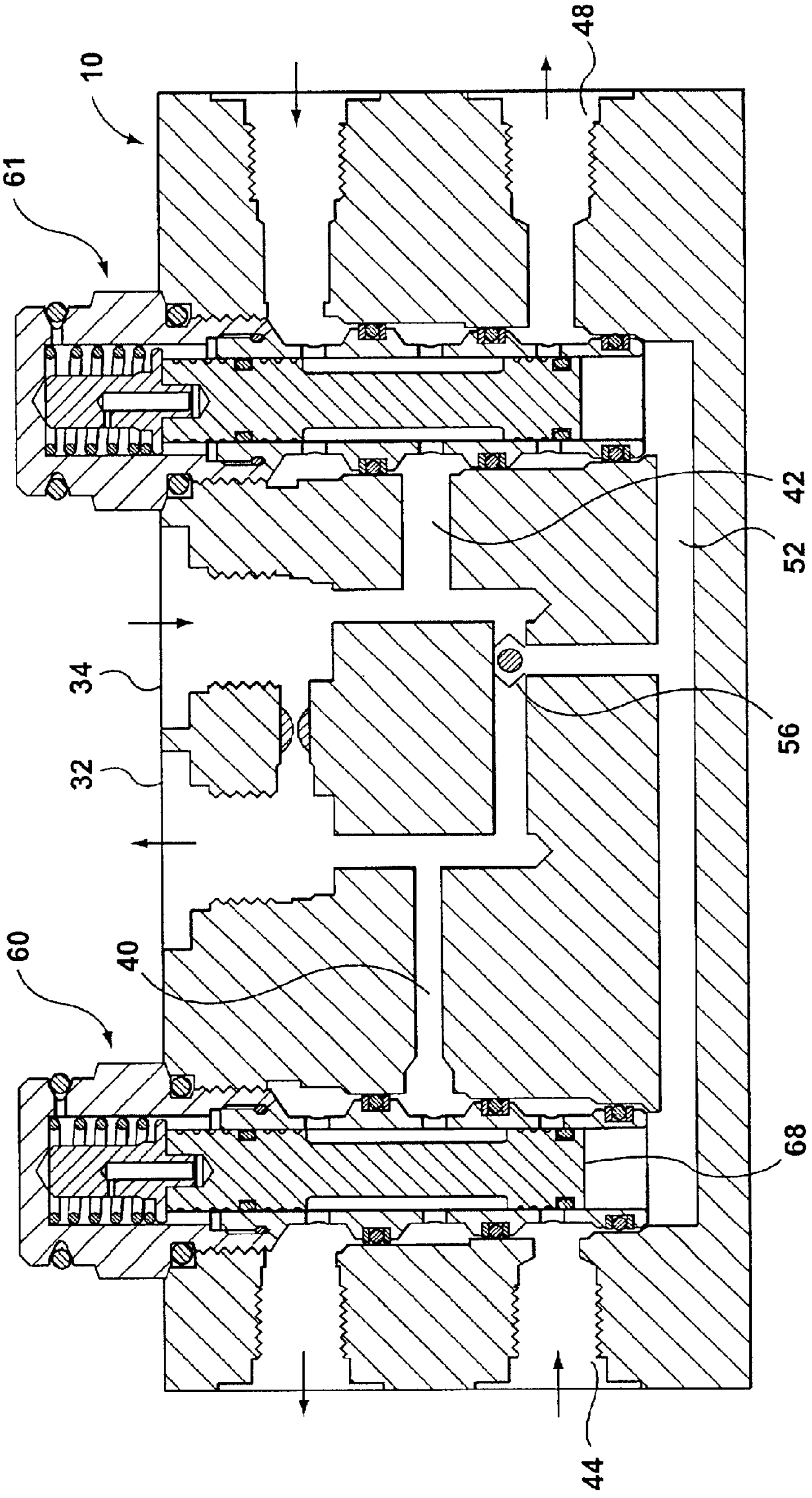
FIG. 5D is a cross-sectional view of the preferred embodiment in the second position, as shown in FIG. 5C, but showing fluid flow in the opposite direction.

If the lift truck operator wishes to actuate the side shifter in the opposite direction, the operator moves the lever 28 all the way in the opposite direction, thus employing component 24, and thereby initiating high pressure flow as described above. As shown in FIG. 5D, the path of the high pressure hydraulic fluid flow through the system is reversed, as described for the widening function of the fork positioner. The valve assembly operation is as described above.

Preferably, the hydraulic operators are able to achieve their required functions while operating at different pressures. One pressure is referred to herein as the lower pressure, while the other pressure is referred to as the higher pressure. Absolute values are, of course, widely variable. However, it is preferred that the two pressures differ by about 50 PSI. For example, in one lift truck, fork positioning can be successfully preformed using pressures of less than 250 PSI, while side shifting can be accomplished using pressures above 325 PSI. Other pressures and other pressure differentials can be used depending on the vehicle and the implements being controlled. The high pressure in the supply lines 12 and 14 is achieved by moving lever 28 quickly to the full open position in the desired direction. When the lever is moved, maximum flow rate through the control panel 11 occurs and pressure quickly builds in the supply line 12 or 14. If the forks are loaded, there will be resistance to movement of the fork positioning cylinder. Therefore, pressure will quickly build. As this occurs, pressure quickly builds within the valve block 30, which shifts selection valves 60 and 61, as explained above. This, in turn, brings full fluid pressure on the side shift cylinder to achieve the desired side shift. If the forks are not loaded, there may be an initial tendency of the fluid to flow toward the fork positioner. However, this will be minimal as full fluid flow is occurring through the control panel 11 and fluid pressure will very quickly build up to cause movement of the selection valves 60 and 61.

When fork positioning is desired, the lever is moved in the desired direction only part way. The initial fluid pressure available at control panel 11 is usually relatively low and, in any event, only a restricted flow occurs. The restricted flow occurs at a lower pressure, and thus, fluid reaching the valve assembly 10 is at the lower pressure. Because fork positioning occurs when the forks are not loaded, the forks can be moved using the lower pressure. Thus, the restricted fluid continues to flow as the forks move and pressure does not build up in supply lines 12 or 14 or in valve block 30. This, in turn, means the selection valves 60 and 61, remain in the starting position shown in FIGS. 2A and 2B under the pressure exerted by spring 74 and fork positioning continues to occur for as long as desired and in the direction desired.

The orifice valve 35 may be provided to reduce any hammer effect which may be caused by sudden changes in direction of the fluid flow.

The preferred embodiment of the invention described above is configured to provide selectable, two-way, hydraulically actuated movement. However, certain hydraulic operators may require only one way movement. The return movement of the hydraulic operator may be provided by some other source, such as a spring or gravity. For such hydraulic operators, the second supply port 34, second block channel 42, second selection valve 61, bi-directional valve 56, and third and fourth operator ports 48, 50 may be omitted.

The present invention may be embodied in other specific forms without departing from the spirit or essential characteristics thereof. The presently disclosed embodiments are therefore to be considered in all respects as illustrative and not restrictive, the scope of the invention being indicated by the appended claims rather than the foregoing description, and all changes which come within the meaning and range of equivalency of the claims are therefore intended to be embraced therein.

What is claimed is:

1. A hydraulic valve assembly for selectably delivering hydraulic fluid from a supply of hydraulic fluid to one of a first hydraulic operator and a second hydraulic operator, said assembly comprising:

a) a valve block defining:

i) a first supply port adapted for fluid communication with said supply;

ii) a second supply port adapted for fluid communication with said supply;

iii) a first operator port adapted for fluid communication with said first hydraulic operator;

iv) a second operator port adapted for fluid communication with said second hydraulic operator;

v) a third operator port adapted for fluid communication with said first hydraulic operator;

vi) a fourth operator port adapted for fluid communication with said second hydraulic operator;

vii) a first chamber, said first chamber being in fluid communication with said first supply port, said first operator port, and said second operator port;

viii) a second chamber, said second chamber being in fluid communication with said second supply port, said third operator port and said fourth operator port;

b) a first selection valve located in said first chamber and a second selection valve located in said second chamber, said first and second selection valves being adapted to move in unison, said first and second selection valves operable between a first position when said hydraulic fluid is at a first pressure and a second position when said hydraulic fluid is at a second pressure, where in said first position, said first selection valve permits fluid communication between said first supply port and said first operator port, and said second selection valve permits fluid communication between said second supply port and said third operator port, where, in said second position, said first selection valve permits fluid communication between said first supply port and said second operator port, and said second selection valve permits fluid communication between said second supply port and said fourth operator port;

wherein said first pressure is lower than said second pressure.

2. The assembly of claim 1, further comprising an actuator operatively connected to said supply, said actuator being selectably movable between a first actuator position adapted to deliver said hydraulic fluid to said first supply port at said first pressure, a second actuator position adapted to deliver said hydraulic fluid to said first supply port at said second pressure, a third actuator position adapted to deliver said hydraulic fluid to said second supply port at said first pressure, and a fourth actuator position adapted to deliver said hydraulic fluid to said second supply port at said second pressure, said first and third actuator positions being adapted to permit reciprocal movement of said first hydraulic operator and said second and fourth actuator positions permitting reciprocal movement of said second hydraulic operator.

3. The assembly of claim 2, wherein when said actuator is in said first and second positions, said hydraulic fluid is returned to said supply from said second supply port, and when said actuator is in said third and fourth positions, said hydraulic fluid is returned to said supply from said first supply port.

4. The assembly of claim 3, wherein said actuator comprises a lever connected to a hydraulic circuit.

5. The assembly of claim 4, wherein said lever is movable from a central at rest position in two opposing directions, where in said first actuator position, said lever is at part travel in one direction and in said third actuator position, said lever is at part travel in an opposite direction, where in said second actuator position, said lever is at substantially full travel in said one direction and in said fourth actuator position, said lever is at substantially full travel in said opposite direction.

6. The assembly of claim 1, wherein said valve block defines a pilot channel, said pilot channel being adapted for fluid communication with said first chamber, said second chamber, and one of said first supply port and said second supply port, said first and second selection valves being adapted for movement by pressure in said pilot channel.

7. The assembly of claim 6, wherein said valve block defines a first and a second block channel, said first block channel extending between said first supply port and said first chamber, said second block channel extending between said second supply port and said second chamber.

8. The assembly of claim 7, further comprising a bi-directional valve located at an intersection of said pilot channel, said first block channel and said second block channel, said bi-directional valve being adapted to provide fluid communication between said first block channel and said pilot channel when said hydraulic fluid is flowing into said first supply port, and between said second block channel and said pilot channel when said hydraulic fluid is flowing into said second supply port.

9. The assembly of claim 8, wherein said bi-directional valve comprises a ball and shuttle valve.

10. The assembly of claim 8, wherein said first selection valve comprises:

a) valve housing defining an open end proximate to said pilot channel and an opposing closed end, said valve housing defining an internal valve chamber communicating with said open end;

b) a valve body movably received within said internal valve chamber, said valve body defining a pressure surface proximate to said open end of said internal valve chamber, wherein said valve body is moved from said first position to said second position by pressure in said pilot channel acting on said pressure surface; and c) a biasing means for urging said valve body toward said first position.

11. The assembly of claim 10, wherein said biasing means is located in said closed end of said valve housing.

12. The assembly of claim 11, wherein said biasing means comprises a spring.

13. The assembly of claim 12, wherein a pressure of 315 PSI or greater acting against said pressure surface is required to overcome the resistance of said spring.

14. The assembly of claim 13, wherein said valve housing defines a plurality of circumferentially arranged openings.

15. The assembly of claim 14, wherein said second selection valve is substantially identical to said first selection valve.

16. The assembly of claim 8, wherein said first hydraulic operator is a fork positioner for a lift truck, and said second hydraulic operator is a side shifter for a lift truck.

17. The assembly of claim 12, wherein said valve block has a box shape, said valve block defining a first face, a second face, and a third face.

18. The assembly of claim 17, wherein said first and second supply ports are located on said first face, said first and second operator ports are located on said second face, and said third and fourth operator ports are located on said third face.

19. A hydraulic valve assembly for delivering hydraulic fluid from a supply of hydraulic fluid to one of a first hydraulic operator and a second hydraulic operator, said first hydraulic operator being a fork positioner for a lift truck and said second hydraulic operator being a side shifter for a lift truck, said assembly comprising:

a) a valve block defining:

i) a supply port adapted for fluid communication with said supply;

ii) a first operator port adapted for fluid communication with said first hydraulic operator;

iii) a second operator port adapted for fluid communication with said second hydraulic operator;

iv) a chamber, said chamber being in fluid communication with said supply port, said first operator port, and said second operator port;

b) a selection valve located in said chamber, said selection valve operable between a first position when said hydraulic fluid is at a first pressure and a second position when said hydraulic fluid is at said second pressure, where in said first position, said selection valve permits fluid communication between said supply port and said first operator port, where in said second position, said first selection valve permits fluid communication between said supply port and said second operator port;

wherein said first pressure is lower than said second pressure.

20. The assembly of claim 19, further comprising an actuator operatively connected to said supply, said actuator being selectably movable between a first actuator position adapted to deliver said hydraulic fluid to said first supply port at said first pressure, a second actuator position adapted to deliver said hydraulic fluid to said first supply port at said second pressure.

21. The assembly of claim 20, wherein said actuator comprises a lever connected to a hydraulic circuit.

22. The assembly of claim 21, wherein said lever is movable from an at rest position into said first and second actuator positions, where in said first actuator position, said lever is at part travel, where in said second actuator position, said lever is at substantially full travel.

23. The assembly of claim 19, wherein said valve block defines a pilot channel, said pilot channel being adapted for fluid communication with said chamber and said supply port, said selection valve being adapted for movement by pressure in said pilot channel.

24. The assembly of claim 19, wherein said valve block defines a block channel, said block channel extending between said supply port and said chamber.

25. The assembly of claim 23, wherein said selection valve comprises:

a) a valve housing defining an open end proximate to said pilot channel and an opposing closed end, said valve housing defining an internal valve chamber communicating with said open end;

b) a valve body movably received within said internal valve chamber, said valve body defining a pressure surface proximate to said open end of said internal valve chamber, wherein said valve body is moved from said first position to said second position by pressure in said pilot channel acting on said pressure surface; and c) a biasing means for urging said valve body toward said first position.

26. The assembly of claim 25, wherein said biasing means is located in said closed end of said valve housing.

27. The assembly of claim, 26, wherein said biasing means comprises a spring.

28. The assembly of claim 27, wherein a pressure of 315 PSI or greater acting against said pressure surface is required to overcome the resistance of said spring.

29. The assembly of claim 25, wherein said valve housing defines a plurality of circumferentially arranged openings.

* * * * *